(12) United States Patent
Blatter et al.

(10) Patent No.: US 8,124,874 B2
(45) Date of Patent: Feb. 28, 2012

(54) INSULATOR DISK FOR SUPPORTING A LINEAR CONDUCTOR, AND AN ELECTRICAL ASSEMBLY INCLUDING SUCH A DISK

(75) Inventors: Johannes Blatter, Gretzenbach (CH); Hugo Hiltbrunner, Vicques (CH); Gerardo Palmieri, Oberentfelden (CH); Robert Luscher, Seon (CH)

(73) Assignee: Areva T&D AG, Oberentfelden-Suisse (CH)

( * ) Notice: Subject to any disclaimer, the term of this patent is extended or adjusted under 35 U.S.C. 154(b) by 500 days.

(21) Appl. No.: 12/360,072

(22) Filed: Jan. 26, 2009

(65) Prior Publication Data

US 2009/0188715 A1 Jul. 30, 2009

(30) Foreign Application Priority Data

Jan. 28, 2008 (FR) ...................... 08 50511

(51) Int. Cl.
*H02G 3/00* (2006.01)

(52) U.S. Cl. ........ 174/70 R; 174/139; 174/662; 439/604
(58) Field of Classification Search ............. 174/70 R, 174/139, 662, 665; 439/604
See application file for complete search history.

(56) References Cited

U.S. PATENT DOCUMENTS

| 2,251,179 | A | * | 7/1941 | Weinerth | 313/142 |
| 3,054,704 | A | * | 9/1962 | Ruoff | 174/137 R |
| 4,122,298 | A | * | 10/1978 | Brandt | 174/28 |
| 7,115,822 | B1 | * | 10/2006 | Day et al. | 174/662 |
| 2008/0190650 | A1 | | 8/2008 | Hiltbrunner et al. | |

FOREIGN PATENT DOCUMENTS

WO   WO 2006/037914 A1   4/2006

* cited by examiner

*Primary Examiner* — Dhirubhai R Patel
(74) *Attorney, Agent, or Firm* — Nixon Peabody LLP

(57) ABSTRACT

An electrical insulator disk has central recesses and peripheral recesses to enable the disk to be mounted floatingly relative to flanges between which the disk is held and to a linear conductor that extends through the disk.

24 Claims, 5 Drawing Sheets

INSULATOR DISK FOR SUPPORTING A LINEAR CONDUCTOR, AND AN ELECTRICAL ASSEMBLY INCLUDING SUCH A DISK

CROSS REFERENCE TO RELATED APPLICATIONS OR PRIORITY CLAIM

This application claims priority to French Patent Application No. 08 50511, filed Jan. 28, 2008.

BACKGROUND

1. Technical Field

The subject of this invention is firstly an electrical insulator disk for supporting a linear conductor that extends through a hole in the disk, and secondly an electrical assembly that includes such a disk.

2. Description of the Related Art

Disks of this kind are used mainly in medium and high voltage switchgear, for supporting the conductors of cables in gas-insulated switchgear or metalclad substation equipment.

There are many publications that describe as many designs for such disks. The present invention is able to improve on the disks that are described in patent publication WO2006/7037914 of the present Applicant. That disk is made of a thermoplastic polymer, and more precisely polyethylene terephthalate (PET); it is substantially flat. As can be seen below, although the present invention is manifestly applicable to disks of that kind, it can also be applied to other forms of disks, and to disks of other materials.

The disks used in the above-mentioned switchgear are subjected to severe conditions, in particular strong electric fields and high temperatures, because the current is passed in an atmosphere that is often corrosive, for which reason a special gas such as sulfur hexafluoride ($SF_6$) is conventionally present so as to give an insulating environment around the conductor. The disks are thus liable to deteriorate over time, and are subjected to severe mechanical forces and deformations, all aggravated by working at high temperature, and to distortion due to thermal expansion, especially when assembled together with other materials. These problems are more acute with a thermoplastic material such as PET, that expands more than the thermosetting polymers that are used much more widely for such disks.

SUMMARY

The basic object of the invention is to optimize the manufacture of the disks where they are made of materials with high thermal expansion. This optimization is with regard to electrical properties, such as partial discharges of static electricity and line voltage, and involves reductions in the forces acting on the disk or adjacent elements by lightening the stresses due to thermal expansion in operation.

Essentially the invention is directed to a particular disk and a particular apparatus associated with it, characterized by various improvements that satisfy several of these objects, often all at the same time.

According to the invention in one aspect, in a general form thereof, an insulator disk for supporting at least one linear conductor in a medium or high voltage electrical apparatus that further includes a chamber for holding the disk therein, the disk having at least one central through hole for the linear conductor and two opposite main faces, is characterized in that the opposite faces are essentially flat, except for a central recess that extends around the through hole, and a peripheral recess extending in an edge portion of the disk.

The above-mentioned patent describes a disk with two main faces that were entirely smooth, whereas document DE 25 26 671 describes a disk that is recessed over almost the whole of its surface, and in which the main faces are therefore essentially not flat. That design is inferior to the design of the present invention, because it involves a general weakening of the disk. It is also different in that any flexibility in the mounting of the disk is absent.

A major feature of the invention is that the disk is mounted in the apparatus in such a way that it floats, without any stress, and is therefore flexible in regard to thermal expansion.

For this purpose the disk of the invention is mounted so as to define an axial clearance between itself and the fastening flanges, and between itself and the electrodes of the conductor, between which the disk is interposed. When the disk expands, it is able to deform so as to take up the clearances, so that its flexibility is greater and the stresses are smaller.

The disk can however be held in its axial position by narrow collar portions that are disposed on the peripheral recess or the central recess, and that abut against either the flanges or the electrodes.

The central recess preferably has a conical outer face, a flat bottom face and a cylindrical inner face. The conical outer face encourages the expulsion of debris arising from partial electric discharges.

The recesses are generally small, being just large enough to ensure the desired flexibility in use and the reduction in the electric field, without weakening the disk too much. Each peripheral recess may accordingly have a width of less than 25% of a radius of the disk, and, on each main face, the central recess may have a depth in the range 10% to 20% of the thickness of the disk. Similarly, on each main face, the peripheral recess may have a depth in the range 5% to 10% of the thickness of the disk, and the distance between the outer face of each central recess and the conductor that extends through the central hole is less than 15% of the radius of the disk.

According to the invention in another aspect, an electrical assembly comprising at least one linear conductor, an insulator disk having a through hole through which the linear conductor extends, and a pair of flanges assembled together with an edge portion of the disk, which edge position is held between the flanges, is characterized in that the disk is separated from the flanges by clearances, and has, on each of two main faces of the disk, a central recess surrounding the through hole.

The disk of this assembly may be configured in accordance with the features of the invention set forth above.

If the linear-conductor electrodes that are disposed in front of the main faces of the disk also extend in front of a portion of the central recess on each side, then the dielectric properties of the disk are reinforced.

Where the internal collar portions are present, it is of advantage if the electrodes are in engagement on these collar portions, so as to give the disk an axial position reference. It is then also of advantage if an elastic sealing ring is compressed between one of the collar portions and the corresponding electrode, in order to preserve the flexibility of the mounting. The elastic sealing ring may be toroidal, the electrode against which it is compressed having a conical chamfer deepening towards the linear conductor, so that the sealing ring is held in a seating of triangular section and is further compressed against the linear conductor.

It is of further advantage for the linear conductor to extend with clearance through the through hole in the disk, that ensures that the space between the conductor and the disk is ventilated so that inclusion of air is avoided.

In another improvement, the electrodes have an outer portion that projects towards the disk and overlaps around the inner collar portion into the central recess.

The disk can also be relieved if a venting groove is disposed along its central through hole, and if the venting groove is extended in length by an aperture defined in one of the electrodes, being open into a free space, that enables the surrounding gas, generally an insulating gas, to enter the clearance space between the linear conductor and the hole in the disk.

The edge portion of the disk may be formed with peripheral through holes in which support tubes and fastening bolts, extending through the flanges and support tubes, are received. In designs incorporating features of the invention, it is advantageous for the peripheral through holes to receive the projecting support tubes, in order to ensure axial flexibility. The support tubes are accordingly in abutment on the flanges, so as to define the spacing between the flanges and to maintain the axial clearance with the edge portion of the disk. This enables the disk to expand in thickness without stressing the bolts that fasten the flanges together.

The outer collar portions may however be in engagement on the flanges, so as to prevent excessive float in the mounting of the disk. These collar portions are able to deform, so as to compress tolerances during assembly and to deform in service in response to thermal expansion. The narrowness of the collar portions leads to a reduction in the deforming force, and the fastening bolts are not overloaded.

The outer collar portions may surround sealing rings between the disks and the flanges. It is then possible to form, on the main faces of the disk, radial grooves that pass under internal lips of the sealing rings, to vent spaces lying between the sealing rings and the disk.

The invention is described below in conjunction with the drawings, that show one particular embodiment.

DETAILED DESCRIPTION

Figure 1:
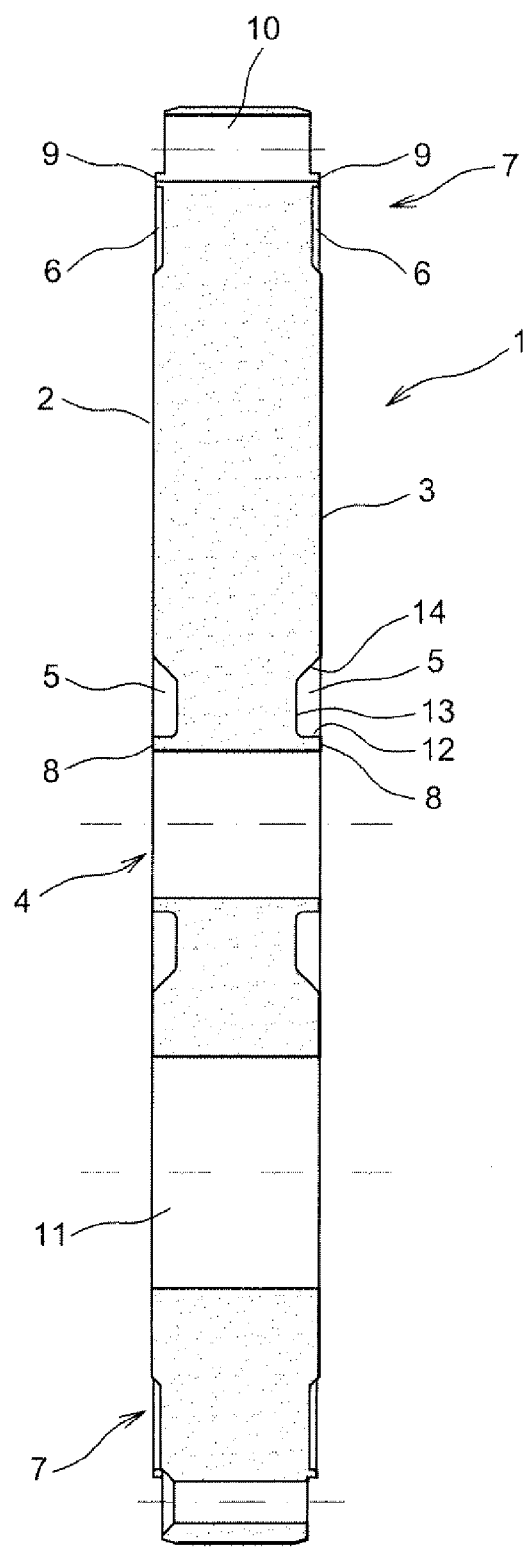
FIG. 1 is a general view of a disk, shown in longitudinal section.

The disk is shown by itself in FIG. 1. It may be made from polyethylene terephthalate (PET) in the way described in the earlier patent; this material has a high coefficient of expansion, to which the invention is particularly applicable.

The disk is made by extrusion and machining, and it is of generally flat form between two flat, parallel main faces 2 and 3. It does however have a central through hole 4 and, on each of the main faces 2 and 3, a central recess 5 surrounding the central through hole 4 and a peripheral recess 6 formed in an edge portion 7 of the disk 1. The recesses 5 and 6 are annular. The central recess 5 is separated from the central through hole 4 by narrow inner collar portions 8, that terminate in the main faces 2 and 3 (outside the recesses 5 and 6). It is however possible that the inner collar portions 8 may be recessed by a few tenths of a millimeter relative to the greater part of the corresponding main face, so that the collar portion is protected before the disk 1 is fitted. Similarly, the peripheral recess 6 has an outer collar portion 9 that terminates in the larger part of the main face 2 or 3. The disk 1 is also formed with peripheral through holes 10, radially outwards of the outer collar portions 9, and may in addition (or only, in some particular embodiments) have a gas port 11 in its central portion for gas communication between one side of the disk and the other. The disk could moreover have its main faces corrugated or formed with concentric circular steps.

The central recess 5 has a cylindrical inner face 12 that is a side face of the inner collar portion 8, a flat bottom face 13, and a conical outer face 14.

Figure 7:
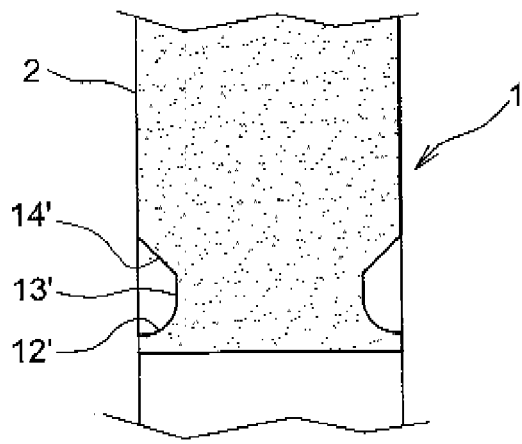
FIGS. 7 and 8 show two further embodiments.

Among other possible versions, as is shown in FIG. 7, the inner face 12' and the bottom face 13' may be at least partly semi-toroidal, and the outer face 14' may again be conical (that assists in trapping dust).

The recesses 5 and 6 are small compared with the greater part of the disk 1, so as not to compromise its rigidity and solidity.

Figure 2:
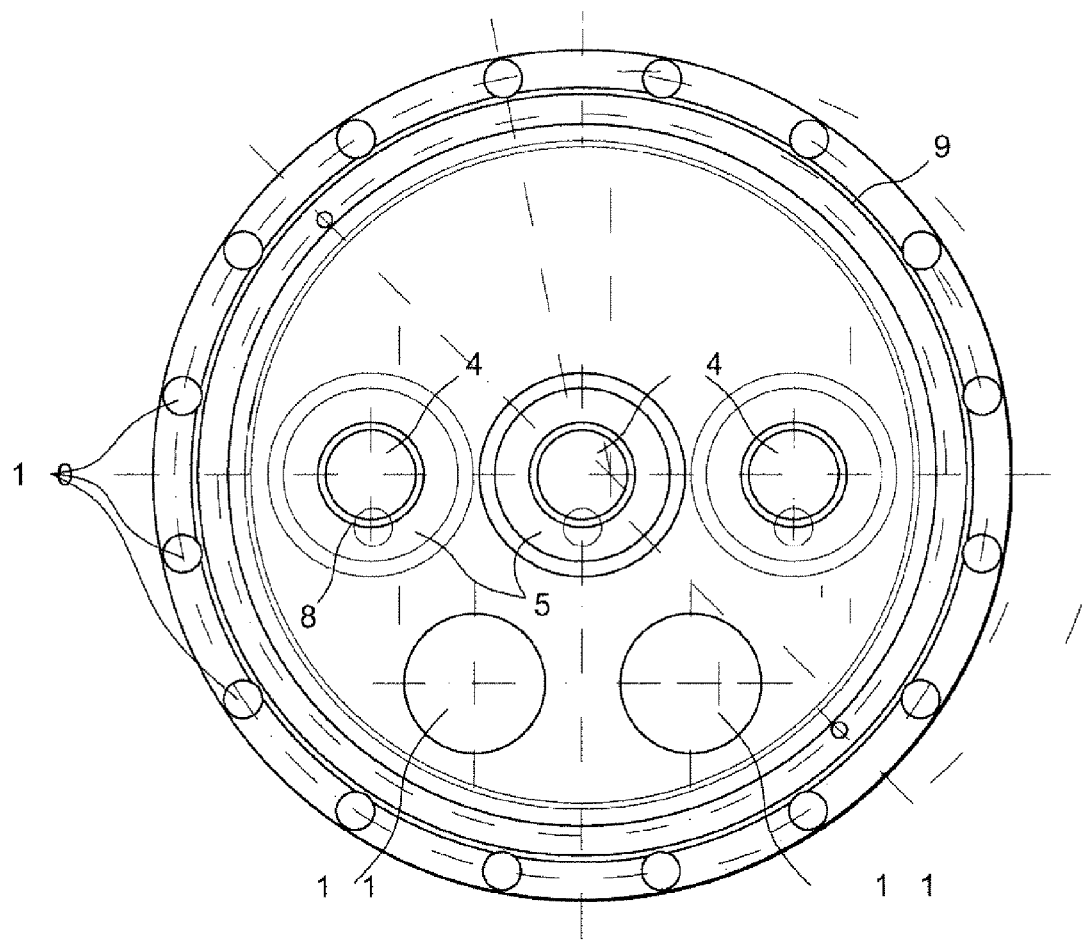
FIG. 2 is a front view of the disk.
Figure 8:
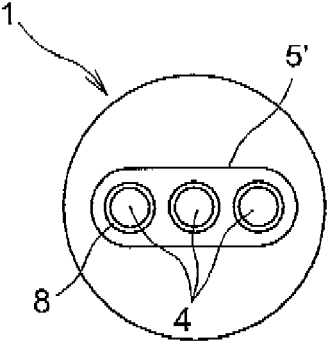

FIG. 2 shows that the invention may include several identical central through holes 4, of which there are three in this example, which holes are arranged on a diameter, together with several gas ports 11. The actual numbers are not critical, however. Where there are several central through holes 4, the central recesses 5 could be replaced by one common central recess 5', as shown in FIG. 8, that contains all the central through holes 4 and their collar portions 8.

Figure 3:
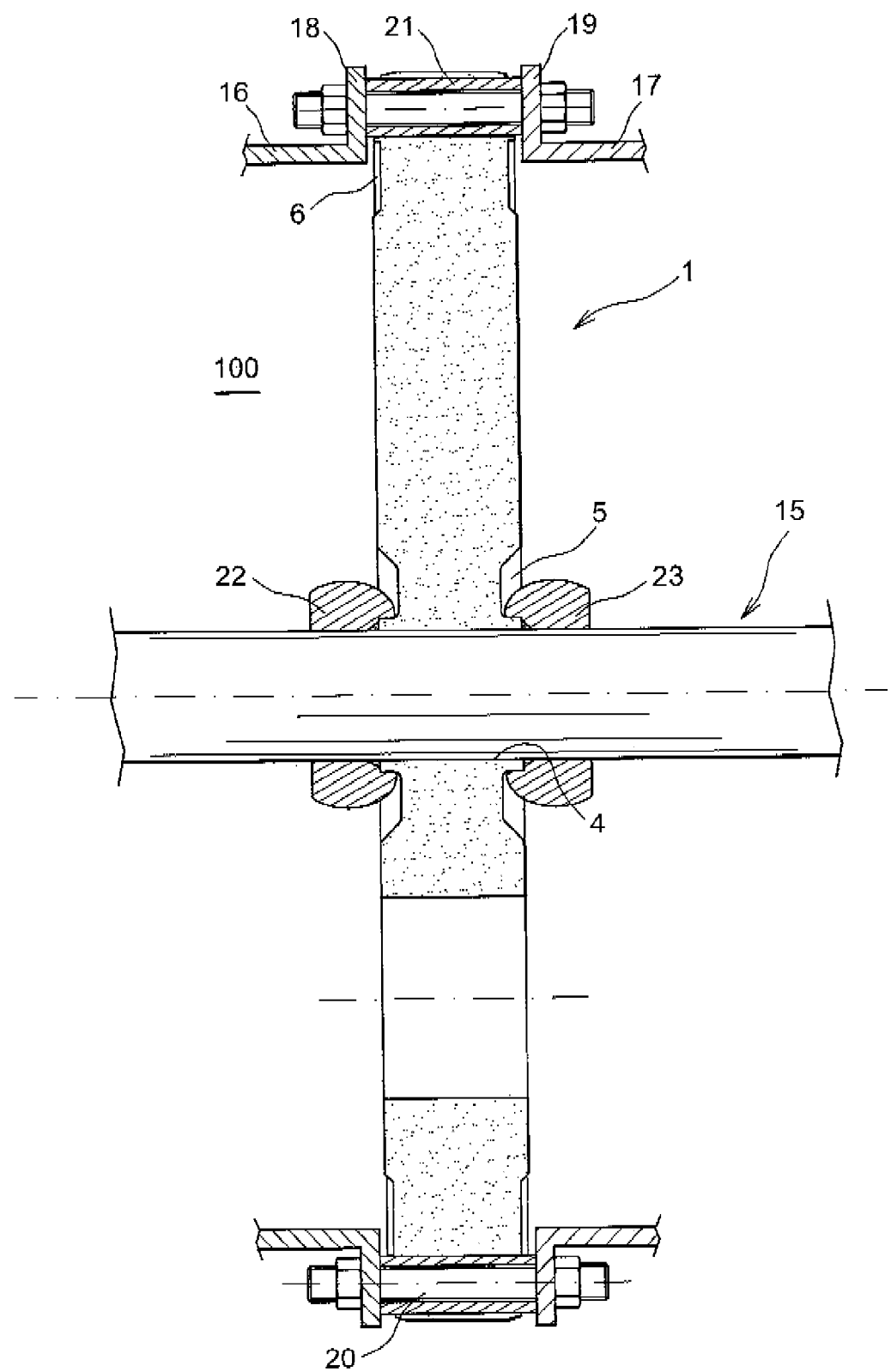
FIG. 3 shows the disk mounted in the support flanges and around a conductor.

FIG. 3 shows diagrammatically the electrical switchgear apparatus in which the disk 1 is used, with a linear conductor 15 extending through each of the central through holes 4 with a small diametral clearance (of around 0.2 millimeters (mm)), and with casings 16 and 17 (or some other kind of parts defining a chamber 100 in which the disk 1 is contained and supporting the disk 1), having flanges 18 and 19 arranged facing each other and secured together with bolts 20 that extend through the peripheral holes 10. The arrangement includes support tubes 21, that extend through the peripheral holes 10 and through which the shanks of the bolts 20 are inserted, so that these support tubes define the spacing between the flanges 18 and 19. Finally, electrodes 22 and 23 are fitted at the two sides of the disk, around the conductor and projecting from it.

The objects of the invention are achieved, in particular, by the following features:

A) The disk 1 is mounted so as to float: the central recesses 5 reduce the amount of contact with the electrodes 22. The electrodes 22 and 23 bear directly on the collar portions 8, that are deformable and able to compensate for dimensional tolerances and thermal expansion. In a modified version, the electrodes 23 are fixed to the collar portions through sealing rings 28 that are described below. In the same way, the peripheral recesses 6 reduce the amount of contact with the flanges 18 and 19. The outer collar portion 9 terminates very close to the same level as the main faces 2 and 3 and the support tubes 21. The outer collar portion 9 is deformable so that it can compensate for tolerances and thermal expansion, in response to small applied forces.

B) The electrical field is limited, being reduced by an appropriate distance between the surfaces of the central recesses 5 and the electrodes 22 and 23.

C) Partial discharges are avoided by avoiding the occurrence of air pockets in the sub-assemblies: the space between the conductors and the disk 1 is vented through a clearance of 0.2 mm between the conductor 15 and the central through hole 4, and through a venting aperture 30 in the electrode 22, with a chamfer (of 1 mm at 45°) on one side of the collar portion 8 and a venting groove 29; and further through a venting groove 32 to the inner lip 34 of a sealing ring 31 (all of this is described in greater detail below).

Figure 4:
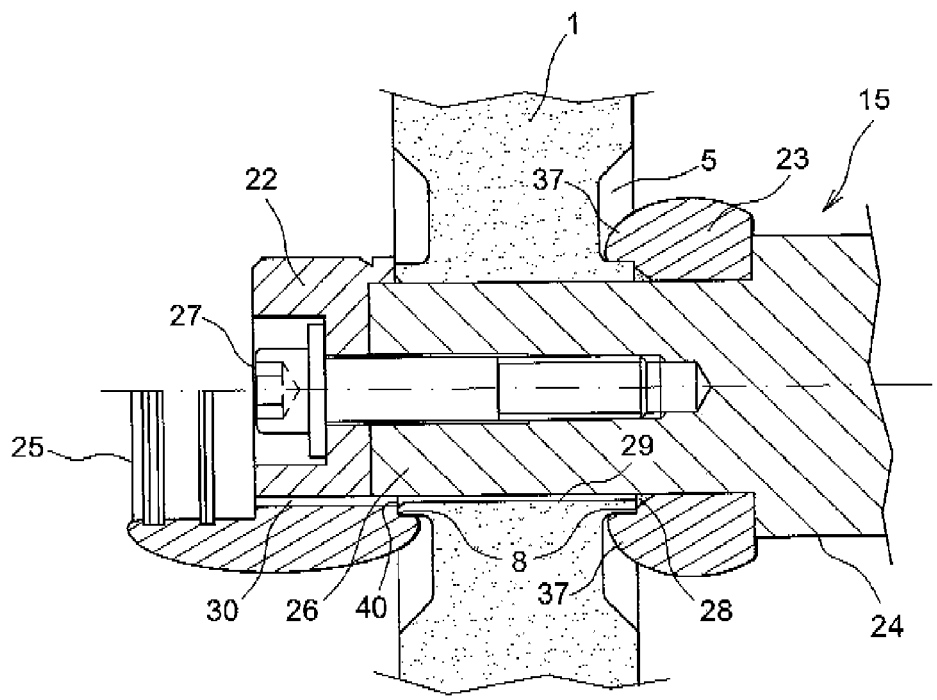
FIG. 4 shows the center of the disk.
Figure 5:
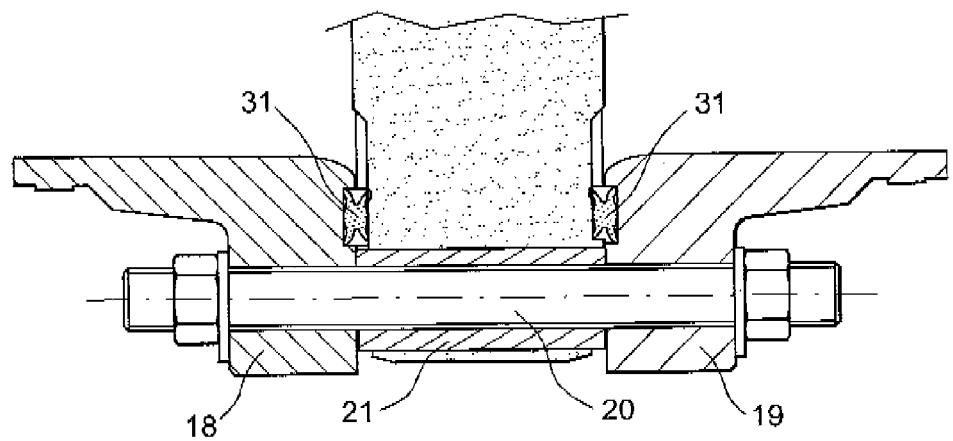
FIGS. 5 and 6 show its periphery.

Reference is now made to FIGS. 4 and 5. The conductor 15 consists of two sections 24 and 25, the first of that has a cylindrical spigot 26 that is inserted through the central hole 4, while the second section 25 is attached to the corresponding electrode 22 by seaming. The conductor 15 is connected by means of a screw 27 fastening the electrode 22 against the spigot 26, so establishing both mechanical and electrical contact in the conductor 15. The electrodes 22 and 23 are in engagement against the inner collar portions 8. The assembly also includes an elastic toroidal sealing ring (O-ring) 28 that is compressed between the electrode 23 and the corresponding inner collar portion 8. The electrode 23 has a conical chamfer that defines a seating of triangular section for the ring 28, that is also compressed radially inwards against the spigot 26. Too stiff an engagement of the collar portions 8 against the electrodes 22 and 23 is therefore avoided: the sealing ring 28 compensates for thermal expansion while ensuring a gas seal between the two sides of the disk 1. Finally, the arrangement includes an axial venting groove 29 in a generatrix of the central through hole 4, that extends from one end of the central hole 4 to the other, and the length of that is extended through the electrode 22 by the venting aperture 30, while the inner radius of the inner collar portion 8 at the junction of the venting groove 29 and venting aperture 30 is formed with a chamfer 40 (1 mm in width at 45°).

The central recesses 5, extending in front of the electrodes 22 and 23 and around them in the radial direction, reduce the surface area of contact between the electrodes and the disk 1, and also the electric field and the danger of sparking. The electrodes 22 and 23 may however, without any disadvantage, have circular projecting elements 37 at their periphery, that are inserted into the central recesses 5 so as to improve the cohesion of the assembly and reduce the local electric field. The central recesses would have to be both small so as not to weaken the disk 1 too much, and quite large so as to reduce the electric field. In practice, their width (in the radial direction of the disk 1) is substantially larger than their depth (in the direction of the thickness of the disk 1), so as to have regard for these conflicting requirements, the electric field being produced mainly in the radial direction, towards the flanges 16 and 17.

FIG. 5 shows the peripheral fastening of the disk 1 in more detail. In particular, it shows sealing rings 31 compressed between the edge of the disk 1 and the respective flanges 18 and 19. The sealing rings 31 also, and with advantage, bear on the outer collar portions that surround them, and this makes fitting of the disk 1 easier.

The width (i.e. the radial dimension) of the outer collar portions may be optimized (in current practice it is a few millimeters), in such a way as to be large enough for the outer collar portions 9 to withstand applied axial forces that are due to conductors or other apparatus fixed on the disk 1 and also the forces due to gas pressure on one side of the disk during refilling with gas (in those versions where the disk is of continuous form), but small enough for the said collar portions 9 to be able to deform in such a way that they can compensate for manufacturing tolerances and thermal expansion in operation, without undue stress being exerted on the bolts 20. The outer collar portions 9 then serve to support the disk 1 without imposing excessive reaction forces on the fastening bolts 20.

The deformation in the assembly, during the fastening process, is essentially passed on to the outer collar portions 9, and some plastic deformation of the bolts 20 has been noted in tests with excessively wide outer collar portions following the occurrence of severe thermal expansion in the disk 1 at working temperatures of the apparatus. A good width of the outer collar portions 9 can be simply calculated knowing their surface area in engagement on the flanges 18 and 19, the total cross section of the bolts 20 and the respective strengths of the constituent materials. Plastic deformation of the bolts 20 would clearly be catastrophic for the quality of the apparatus, while plastic deformation of the outer collar portions 9 has fewer consequences because they do not have a sealing function.

Thus the initial tightening force of the bolts 20 passes through the flanges 18 and 19 and support tubes 21 when the outer collar portions 9 are put in facing relationship to the flanges 18 and 19 with a positive clearance; however, when there is a negative clearance from the outset, or as a result of thermal expansion at the outset, tightening forces are also applied to the outer collar portions 9. These forces are however limited, to 10% or 80% of the initial tightening force of the bolts 20, due to the width controlled described above.

Figure 6:
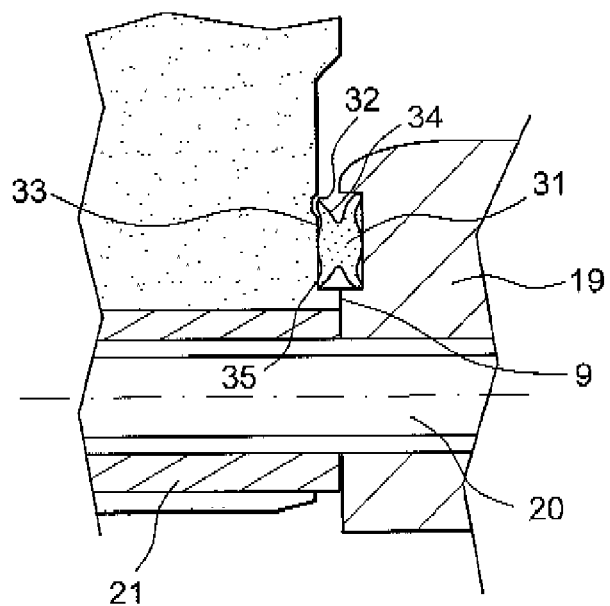

As is shown in FIG. 6, a venting groove 32 may be formed at the surface of the disk so as to provide communication with a space 33 defined between the disk 1 and the sealing ring 31, and also to put an inner lip 34 and an outer lip 35 of the sealing ring 31, these lips being concentric, into communication with the internal space 36 of one of the flanges, 19, by passing under the inner lip 34. The seal provided by the ring 31 remains assured by the outer lip 35 and other lips compressed against the flange 19. This arrangement enables the insulating atmosphere in the space 36 to penetrate under the sealing ring 31.

The peripheral recesses, like the central recesses 5, are wider than they are deep, so as to reduce the essentially radial electric field between the surfaces of the disk 1 and the flanges 18 and 19 without over-weakening the disk 1. They very slightly overlap the flanges 18 and 19 towards the center of the disk 1.

The embodiment described above includes circular conductors. It would be possible to apply the invention to conductors of any cross section by modifying the shape of the central through holes, the central recesses and the inner collar portions.

The invention claimed is:

1. An insulator disk for supporting at least one linear conductor in a medium or high voltage electrical apparatus, the medium or high voltage electrical apparatus including a chamber for holding the disk therein, the disk having at least one central through hole for the said linear conductor, two opposite main faces and an edge portion between the two opposite main face, and being characterized in that the said opposite faces are essentially flat, except for a central recess that extends around the said through hole, and a peripheral recess in the edge portion of the disk.

2. An insulator disk according to claim 1, characterized in that the disk includes an inner collar portion disposed between the said through hole and the central recess.

3. An insulator disk according to claim 2, characterized in that the central recess has a conical outer face, a bottom face and an inner face.

4. An insulator disk according to claim 3, characterized in that the bottom face is flat.

5. An insulator disk according to claim 1, characterized in that the disk includes an outer collar portion disposed on the peripheral recess.

6. An insulator disk according to claim 1, characterized in that a distance between the at least one linear conductor extending through the central hole and an outer face of the central recess is less than 15% of a radius of the disk.

7. An insulator disk according to claim 1, characterized in that the disk has a plurality of central through holes and wherein the central recess is only one central recess, and wherein the only one central recess contains all of the plurality of central through holes.

8. An insulator disk according to claim 1, characterized in that the peripheral recess has a width of less than 25 percent of a radius of the disk.

9. An insulator disk according to claim 1, characterized in that, on each of said main faces, the central recess has a depth in the range 10 percent to 20 percent of the thickness of the disk.

10. An insulator disk according to claim 1, characterized in that, on each of said main faces, the peripheral recess has a depth in the range 5% to 10% of the thickness of the disk.

11. An electrical assembly comprising at least one linear conductor, an insulator disk having a through hole, wherein the at least one linear conductor extends through the through hole, wherein the insulator disk comprises two main faces and an edge portion between the two main faces, and a pair of flanges assembled together with the edge portion of the disk, which the edge portion is held between the pair of flanges, wherein the disk is separated from the flanges by clearances, and wherein a central recess is provided on each of the two main faces of the disk surrounding the said through hole.

12. An electrical assembly according to claim 11, wherein the main faces of the disk are essentially flat, except for the central recess that extends around the through hole, and wherein a peripheral recess extends in the edge portion of the disk.

13. An electrical assembly according to claim 11, characterized in that the at least one linear conductor comprises at least two electrodes that are disposed in front of the main faces of the disk and extend in front of a portion of the central recess.

14. An electrical assembly according to claim 13, in which the disk includes an inner collar portion disposed between the said through hole and the central recess on each of said main faces, and wherein the electrodes are in engagement on the inner collar portion.

15. An electrical assembly according to claim 14, characterized in that an elastic sealing ring is compressed between one of the inner collar portions and one of the electrodes.

16. An electrical assembly according to claim 15, characterized in that the electrodes against which the elastic sealing ring is compressed has a conical chamfer deepening towards the linear conductor, so that the sealing ring is held in a seating of triangular cross section and is further compressed against the linear conductor.

17. An electrical assembly according to claim 14, characterized in that the linear conductor extends with a clearance through the said through hole in the disk.

18. An electrical assembly according to claim 14, characterized in that the electrodes have an outer portion that projects towards the disk and overlaps around the inner collar portion into the central recess.

19. An electrical assembly according to claim 13, characterized by a venting groove disposed along the through hole of the disk, with the venting groove being extended in length by an aperture defined through one of the electrodes to open into a free space.

20. An electrical assembly according to claim 11, characterized in that the said edge portion of the disk is formed with peripheral through holes, wherein the peripheral through holes receive support tubes, the support tubes being in abutment on the said flanges, and fastening bolts extending through the flanges and support tubes.

21. An electrical assembly according to claim 20, wherein a peripheral recess extends in the edge portion of the disk and wherein the disk includes outer collar portions disposed on the peripheral recess and the outer collar portions are in abutment on the flanges.

22. An electrical assembly according to claim 21, characterized in that the outer collar portions have a radial width that is selected so that the outer collar portions withstand axial forces exerted on the disk, while being deformable in use without causing plastic deformation of the fastening bolts.

23. An electrical assembly according to claim 22, characterized in that the outer collar portions surround sealing rings between the disk and the flanges.

24. An electrical assembly according to claim 23, characterized by radial grooves on the main faces of the disk, that extend under internal lips of the sealing ring, whereby to vent spaces defined between the sealing rings and the disk.

* * * * *